United States Patent [19]

Ebbeler

[11] 4,353,745
[45] Oct. 12, 1982

[54] CLEANER FOR ANTI-GRAFFITI SYSTEM
[75] Inventor: Robert E. Ebbeler, Cincinnati, Ohio
[73] Assignee: Chemed Corporation, Cincinnati, Ohio
[21] Appl. No.: 296,434
[22] Filed: Aug. 26, 1981
[51] Int. Cl.$^3$ ............................................... C09D 5/20
[52] U.S. Cl. .......................................... 106/2; 134/38; 252/153; 252/171; 252/548; 427/154
[58] Field of Search .............. 106/2; 427/154; 134/38; 252/126, 127, 166, 171, 153, 548

[56]  References Cited
U.S. PATENT DOCUMENTS

| | | | |
|---|---|---|---|
| 3,057,812 | 10/1962 | Straughan et al. | 260/29.6 NR |
| 3,294,726 | 12/1966 | Wyner | 260/29.6 ME |
| 3,318,721 | 5/1967 | Lineburg | 260/29.6 E |
| 3,321,431 | 5/1967 | Cruden et al. | 260/29.6 |
| 3,486,926 | 12/1969 | Rideout et al. | 117/104 |
| 3,692,726 | 9/1972 | Oehmichen | 260/29.6 R |
| 3,915,880 | 10/1975 | Sepulveda | 134/38 |
| 4,022,743 | 5/1977 | Patella et al. | 260/29.6 T |
| 4,065,416 | 12/1977 | Christenson et al. | 260/17.4 SG |
| 4,241,141 | 12/1980 | Dill | 427/154 |

Primary Examiner—Lorenzo B. Hayes
Attorney, Agent, or Firm—Wood, Herron & Evans

[57]  ABSTRACT

An aqueous composition which produces a clear, protective coating on a wide variety of surfaces, consisting essentially of a suspension of vinylidene polymers, ethylene glycol monoethyl ether, ethylene glycol monobutyl ether, a halogenated polysilane surfactant, sodium benzoate rust proofer, defoamer (mineral oil in ethylene glycol monobutyl ether), and water. A cleaning and priming composition is also provided, for removal of graffiti and the protective coating. The latter comprises preferably ethylene glycol monoethyl ether, methylene chloride, nonylphenol ethoxylate, triethanolamine, and water.

3 Claims, No Drawings

CLEANER FOR ANTI-GRAFFITI SYSTEM

The instant coating composition and cleaner represent an improvement over what are known to us as the "Gleeson Formulations." The latter include two coating compositions (one for hard surfaces and the other for soft surfaces, e.g., vinyl surfaces) and a cleaner. These original Gleeson coatings had the following compositions:

|  | Hard Surface | Soft Surface |
| --- | --- | --- |
| Water | 37.5% | 25.00% |
| Methyl ethyl ketone | — | 16.67% |
| Levelene, 1% aqueous solution | 12.5% | 16.67% |
| Rhoplex HA-16 | 37.5% | 25.00% |
| Cellosolve | 12.5% | 16.67% |
|  | 100.00 | 100.00 |

The Gleeson cleaner consisted of 90% Cellosolve and 10% of a 1% Levelene solution.

Cellosolve, Levelene, and Rhoplex HA-16 are defined elsewhere herein.

When the coating composition of this invention is applied to a properly prepared substrate it will provide a dry film resistant to permanent disfiguration by felt tip markers, ball point pens, make-up, spray paint, etc. Coating and soils are stripped from surface using the specifically designed cleaner.

Degradation of surfaces by vandalism, pollution, or excessive soiling is an unsightly and most often a costly problem. Removal of these marks often entails completely refinishing the surface or costly extensive cleaning and refinishing procedures.

The graffiti "artist" is one of the most extensive problems dealt with by maintenance personnel of housing, public transit, and public buildings. Often times only sandblasting or repainting the surface will remove the markings. The usual tools of the "artist" include spray paint, ball point pens, make-up and most often the felt tip markers. This is a wide variety of markers with very diverse solvent systems that can affect substrates differently.

Surfaces that come into contact with heavy soil loads or several harsh pollutants can become a significant maintenance problem. They not only cause a soiling "stain" but can be deleterious to the surface.

The instant coating composition forms a barrier on the substrates over which it is applied. Two or three coats of the instant composition applied over a properly cleaned and prepared surface will prevent the penetration of most felt tip markers, ball point pens, spray paint, and make-up, and their permanent marks on said surface. The application of the cleaning composition of this invention will strip away these markings and the "sacrificial" barrier coating, leaving behind a clean substrate. The instant composition coating can then be reapplied to the cleaned area restoring the homogeneous dry protective film.

The instant coating composition includes the following ingredients, some being additions and improvements over and above the Gleeson Formulations: A nonionic self cross linking polymer (Rhoplex HA-16; containing: methyl methacrylate, methyl acrylamide and ethyl acrylate) which dries to a clear film. This polymer is the basis of the protective barrier of the instant composition. This polymer is unique in that it is both resilient enough to resist the soil penetration, soft enough to adhere well to very flexible surfaces and pliable enough to withstand temperature extremes without losing adherence to the substrate.

The coating product has several ingredients that play a support role as aids in the film formation. Among these are a blend of glycol ethers that act to coalesce the acrylic polymer particles and aid in film formation. The composition also contains two leveling aids that are also important in film formation; one is a fluorinated polysilane (Levelene) and the other (Troykyd LLBA polymer blend from Troy Chemical) also aids in the sprayability of the composition. The composition contains a non-silicone defoamer (Troykyd 333, containing aliphatic hydrocarbon and ethylene glycol mono butyl ether from Troy Chemical) for application of the material through spray systems or any system that is a generator of foam.

The composition contains sodium benzoate, a rust inhibitor, so that the solution can be applied to unpainted ferrous metals and not promote flash rusting.

Finally the composition contains an alkaline pH adjuster (ammonium hydroxide) to neutralize the polymers and aid in stability.

The companion product to the above composition is a cleaning and conditioning agent. This companion product is used to clean and prepare soft vinyl surfaces for better adhesion of the coating, and as a stripper to remove the coating from any surface, hard or soft, after soiling.

The companion cleaning product has a composition that includes the following: A chlorinated solvent (methylene chloride) used to prepare vinyl surfaces for the coating composition. A different compound (methyl ethyl ketone), a flammable ingredient, was contained in a special form of the Gleeson barrier coating specifically designed for flexible vinyl surfaces.

A coalescent (ethylene glycol mono ethyl ether) is in the companion cleaning composition. However, here it is used as a solvent to redisperse the coating into solution and thus strip it.

The cleaning composition also contains a nonionic surfactant to aid in the surface activity of the cleaning solution. The Gleeson cleaner included a fluorinated polysilane wetter, an equally good but much more expensive raw material. Finally, the cleaner contains 0.1–5.0% triethanolamine.

The following compositions have been found to be effective barrier coatings:

|  | Parts by Weight | |
| --- | --- | --- |
|  | Broad Range | Preferred Range |
| Deionized Water | 1–99 | 19.0–30.0 |
| Sodium Benzoate | 0.1–10.0 | 1.0–3.0 |
| Non Silicone Defoamer (Troykyd 333) | 0.1–10.0 | 0.2–1.5 |
| Fluorinated Polysilane (1% Soln) (Levelene) | 1–50.0 | 10.0–20.0 |
| Latex Leveling and Bodying agent (Troykyd LLBA polymer blend, from Troy Chemical Co.) | 0–20.0 | 0–10.0 |
| Nonionic Latex self cross linking polymer (Rhoplex HA-16) | 1–99 | 30–60.0 |
| Ethylene Glycol Mono Ethyl Ether | 1–50 | 2–18.0 |
| Ethylene Glycol Mono Butyl Ether | 1–50 | 2–18.0 |

-continued

|  | Parts by Weight | |
|---|---|---|
|  | Broad Range | Preferred Range |
| Ammonium Hydroxide | 0.01–10 | 0.05–2.0 |

It will be noted that this invention omits the more flammable MEK in favor of a safer and equally efficient vinyl preparation agent, methylene chloride. This change in both the instant coating composition and the companion cleaning product makes a two-step application process desirable, where the cleaner is applied first to prepare the surface and then the coating composition can be applied with good adhesion.

Suitable compositions for the companion cleaner are:

|  | | Parts by Weight | |
|---|---|---|---|
|  | Specific | Broad Range | Preferred Range |
| Ethylene glycol mono ethyl ether | 75.0% | 1.0–99.0 | 45.0–85.0 |
| Water | 9.0% | 1.0–20.0 | 8.0–12.0 |
| Methylene Chloride | 15.0% | 5.0–55.0 | 10.0–20.0 |
| Nonionic Surfactant | 0.5% | 0.1–5.0 | 0.3–1.0 |
| Triethanolamine | 0.5% | 0.1–5.0 | 0.3–1.0 |
|  | 100.0% | | |

With the elimination of the MEK it was then possible to consolidate the two Gleeson barrier coatings into the instant single coating composition. A preferred composition is:

| Deionized water | 28.5% |
|---|---|
| Sodium benzoate | 1.5% |
| Non-silicone defoamer | 0.5% |
| Fluorinated polysilane (1% soln) | 12.5% |
| Nonionic self cross linking polymer | 45.0% |
| Ethylene glycol mono ethyl ether | 6.0% |
| Ethylene glycol mono butyl ether | 6.0% |
| Ammonium hydroxide | qs to pH 9.0 |
|  | 100.0% |

In formulating the coating composition within the ranges given elsewhere, the following may be noted.

I. Deionized water. When decreasing the amount of water the solids level consequently is raised. After a point (approximately 19.5% water) the formula becomes unstable at elevated temperatures (120° F.) and forms an unusable gel.

II. Sodium Benzoate. This prevents flash rusting on unprepared ferrous metals. It was found that a minimum of 1.5% of sodium benzoate was necessary to prevent flash rust. Any amount less caused flash rusting.

III. Nonsilicone defoamer. (Troykyd 333-defined elsewhere). It was found that concentrations of this defoamer between 0.5% and 1.5% controlled the foaming of the solution, breaking any foam quickly and forming a foam free surface, an important feature when applying the film by spraying. Compositions with as low as 0.5% nonsilicone defoamer controlled foaming but concentrations over 1.5% controlled foaming but deleteriously affected the coating gloss and water resistance.

IV. Fluorinated Polysilane (Levelene, 1% aqueous soln). An increase in concentration has little effect on the wetting of the solution.

V. Nonionic self crosslinking polymer (Rhoplex HA-16). The integral ingredient in the formula. It was found that good films were produced between 30% and 60%. Films of higher concentrations showed very little change in protection and materials costs make it impractical.

VI. Coalescents. Ethylene glycol mono ethyl ether alone in the solution when applied to a surface did not coalesce properly. (The liquid pooled on the surface and formed a spotted lusterless film.) Films formed with ethylene glycol monobutyl ether exclusively were level and lustrous, but ethylene glycol mono butyl ether in the formulation by itself gelled the formulation in heat stability testing. A combination of 50% ethylene glycol mono ethyl ether and 50% ethylene glycol mono butyl ether performed well in the instant combination. Other combinations of the two either formed incomplete films or gelled on heat stability testing.

It was also found that an increase in the concentration of this 50:50 mixture above 12% of formulation caused gelling of the formulation also.

VII. Ammonium Hydroxide. A widely known adjustment to neutralize the polymers in the system to enhance stability. Final pH should be between 8.0 and 9.0 for proper neutralization.

When the original Gleeson coatings were applied there were several deficiencies including flash rusting on unprepared ferrous metal surfaces, foaming of the solution when sprayed, very low flash point solvents, and bad coating characteristics. Methyl ethyl ketone (MEK) was added simply to provide better adhesion of the coating on vinyl. There was a move to remove it not only to simplify the Gleeson system into one barrier coating, but also because MEK has a very low and undesirable flash point.

The instant invention is thus directed to an improvement in the Gleeson formulations whereby (a) the two Gleeson coating compositions are modified to provide one composition suitable as a coating for both hard and soft surfaces, and said single coating now carries a rust preventive and a defoamer (to permit spraying), and (b) the Gleeson cleaner is modified so that it will serve as a primer and to clean the single coating.

Aside from the Gleeson Formulations the prior art has suggested numerous aqueous coating compositions intended to form clear protective coatings for interior and/or exterior use. U.S. Pat. No. 3 790 520 to R. Ludwig discloses a latex composition comprising a copolymer of an alkyl acrylate and/or alkyl methacrylate with vinylidene polymers such as different alkyl methacrylates, an acrylonitrile, a vinyl ester, an acrylamide and a vinyl halide, and an aliphatic glycol containing 2 to 6 carbon atoms and/or an aliphatic glycol ether containing 4 to 8 carbon atoms. The copolymer contains more than 40% of an alkyl acrylate the alkyl group of which has from 1 to 8 carbon atoms and/or alkyl methacrylates the alkyl group of which has from 4 to 12 carbon atoms, and from greater than 15% to less than 55% vinylidene monomers copolymerizable with the acrylate and/or methacrylate and having a terminal $CH_2=$ group. The aliphatic glycol and/or aliphatic glycol ether is present in an amount ranging from 20 to about 100 parts by weight per 100 parts by weight of the copolymer, and preferably from 20 to 60 parts by weight per 100 parts by weight of the copolymer. The compositions of this patent are alleged to provide films having resistance to dirt pick-up, resistance to water spotting and blushing and to atmospheric aging, along with adhesive properties.

U.S. Pat. No. 4 241 141 to D. W. Dill discloses a composition for providing a sacrificial coating on painted and other non-flexible surfaces, the coating being removed by an ammoniated cleaner after being marked by graffiti. The coating is alleged to be impermeable to penetration by inks, pigments and dyes in currently used writing instruments. The composition consists essentially of from 10% to 35% by weight of a polymer having a monomer content of 25% to 70% by weight hard monomer, 15% to 50% by weight soft monomer, and 15% to 30% by weight of an acid monomer, the polymer being solubilized with sodium and/or potassium hydroxides; up to 15% by weight of a plasticizer; up to 2% by weight of a coalescing solvent; up to 3% by weight of defoamers and/or leveling agents; and 45% to 90% water, the composition having an MFT of less than 30° C. and a pH from 7.0 to 10.0. The hard monomer is stated to be any acrylic or vinyl monomer which produces a homopolymer having a brittle point above 20° C. The soft monomer is stated to be any acrylic monomer which produces flexible homopolymers having a brittle point below 20° C.

The acid monomer is a carboxylic acid monomer having at least one carboxylic acid group, such as acrylic acid, methacrylic acid, itaconic acid, maleic acid and the like.

The plasticizer is the sodium and/or potassium salt of a maleic anhydride adduct with a mixed alpha olefin having chain lengths greater than 30 carbon atoms.

The coalescing solvent is diethylene glycol monoethyl ether and/or diethylene glycol monobutyl ether.

Additional United States patents disclosing aqueous compositions adapted to provide protective coatings or films include U.S. Pat. Nos. 3 057 812; 3 294 726; 3 316 200; 3 318 721; 3 321 431; 3 486 926; 3 692 726; 4 022 743; and 4 065 416.

The coating compositions of this invention provide an impervious coating on a variety of surfaces exhibiting optimum resistance to water spotting and blushing, resistance to atmospheric aging, scratch resistance, resistance against penetration by dirt, and by inks, pigments and dyes present in writing instruments and spray paints, and resistance against removal by detergent or alkaline compositions. At the same time the coating of the invention can be readily removed, when necessary, by means of the cleaning composition disclosed herein. If a portion of a coating is removed, this area can be recoated and "feathered" into the existing areas of the coating.

According to the invention there is provided a composition adapted to produce a clear, protective coating consisting essentially of an aqueous suspension of certain vinylidene polymers; ethylene glycol monoethyl ether; ethylene glycol monobutyl ether; a nonionic surfactant; a rust proofer; a defoamer; and water; said vinylidene polymers constituting from about 10% to about 25% of the total weight of the composition and comprising, on a water-free basis, from about 40% to about 84% by weight of an alkyl acrylate wherein the alkyl group contains 1 to 2 carbon atoms, from about 15% to about 55% by weight of an alkyl methacrylate wherein the alkyl group contains 1 to 2 carbon atoms, and from about 1% to about 5% by weight methacrylamide; said ethylene glycol monoethyl ether and said ethylene glycol monobutyl ether each constituting about 6% of the total weight of said composition; said nonionic surfactant constituting from 0.10% to about 0.2% of the total weight of said composition and consisting essentially of a halogenated polysilane; the balance of said composition being water.

In the above composition each of the ingredients is essential and omission of any results in loss of one or more of the desired properties. The percentage range and type of the nonionic surfactant is important, as are the percentages of ethylene glycol monoethyl ether and ethylene glycol monobutyl ether. While less important, the percentage ranges and types of vinylidene polymers are important in achieving the optimum combination of properties.

In the above compositions, the preferred alkyl acrylate is ethyl acrylate and the preferred alkyl methacrylate is methyl methacrylate.

Excellent results have been obtained with vinylidene polymers sold by Rohm and Haas Company under the trademark RHOPLEX HA-16. This is provided in the form of an aqueous suspension of nonionic, self crosslinking polymers containing about 45.5% polymer solids comprising, on a water-free basis, about 40% to about 84% ethyl acrylate, about 15% to about 55% methyl methacrylate, and about 1% to about 5% methacrylamide. The suspension also contains 4.7% of a cross-linking mix comprising methylacrylamide and formaldehyde. The film formed by incorporation of these polymers in the coating composition of the instant invention has been found to be tough and hard, resistant against water spotting and blushing, resistant to atmospheric aging, scratching, penetration by dirt and by inks, pigments and dyes present in writing instruments and spray paints. The film is also resistant against removal by detergent or alkaline solutions.

The preparation of the Rhoplex HA-16 polymer emulsion forms no part of the present invention and hence is not described herein.

The presence of at least 0.08% by weight of the total weight of the composition of a halogenated polysilane as a nonionic surfactant has been found to be desirable, particularly for application of a protective coating to flexible polyvinyl surfaces. The surfactant has been found to prevent an "orange peel" effect in the dried coating, and performs the usual functions of acting as a wetting, leveling and emulsifying agent. Best results have been obtained with a complex fluorinated polysilane sold under the trademark LEVELENE 100 by Ecology Chemicals. It is miscible with water and most conventional organic solvents, and has a pH of 7.5 in a 1% aqueous solution. At a concentration of 0.01%, it reduces the surface tension of water from 72.0 dynes/cm to 20.5 dynes/cm.

The presence of 6% ethylene glycol monoethyl ether and 6% ethylene glycol monobutyl ether has also been found to be important. Ethylene glycol monoethyl ether is sold under the registered trademark CELLOSOLVE by Union Carbide Corporation. The above mentioned butyl analog is known as butyl Cellosolve. Both have been found to be necessary as film forming and coalescing agents and for their mutual solvent effect, thus preventing separation of phases. They also control the surface tension of the composition so as to cause it to flow properly on the surfaces being coated.

When used as a primer on flexible polyvinyl surfaces prior to application of the protective coating composition of the present invention thereto, the cleaning composition removes dirt and other contamination, and more importantly etches the polyvinyl surfaces so as to ensure strong adherence of the dried coating thereto. The cleaner is also used to remove the coating when it has been defaced by graffiti, thereby preparing the surface for a new coating. The cleaning composition may be applied by spraying, brushing or wiping onto the surface. When the coating and dirt have been loosened, the surface should be wiped off with a clean, lint-free cloth. On irregular surfaces, a stiff bristled brush may be used to scour less accessible areas.

While the percentage ranges of the cleaner composition are not critical, at least about 70% ethylene glycol monoethyl ether should be present to act as a mutual solvent for the methylene chloride and water and to cause the composition to flow readily on the surfaces being cleaned. At least about 5% by weight methylene chloride is needed to act as a solvent for the coating and graffiti thereon. As indicated above, it also has an etching effect on polyvinyl surfaces. A maximum of about 17% methylene chloride is preferred in order to avoid severe etching and to avoid removal of pigment when used as a primer.

The nonionic surfactant acts as a wetting agent and assists in lifting dirt and graffiti from the surface being cleaned.

EXAMPLE 1

A coating composition embodying the invention was prepared as follows:

| Ingredients | Wt. % |
| --- | --- |
| Water, deionized | 28.5 |
| Sodium benzoate (flash rust proofer) | 1.5 |
| Troykyd Defoamer 333 (78% mineral oil in 22% butyl Cellosolve) | 0.5 |
| Levelene 100 Premix (1% solution of complex fluorinated polysilane in water) | 12.5 |
| Rhoplex HA-16 (emulsion of nonionic self-crosslinking polymers, viz., methyl methacrylate, methyl acrylamide, and ethyl acrylate) | 45.0 |
| Cellosolve | 6.0 |
| Butyl Cellosolve | 6.0 |
| | 100.0 |

The ingredients were added in the order listed with moderate stirring. Each ingredient was dissolved or dispersed before the next was added. PH was adjusted to 9.0+0.5 with NH$_4$OH and the mix thereafter stirred another fifteen minutes.

The composition prepared as described above was applied to a flexible polyvinyl surface by wiping on with cloths. The polyvinyl surface was first primed by application of the cleaning composition disclosed below. Two coats of the coating composition were applied with a drying time of ½ hour between coats and two hours after the second coat. The resulting coating was glossy, smooth, free of bubbles and "orange peel" effect.

Hard-surface panels were also coated with the above composition with excellent results.

After the surfaces had dried, they were marked with felt-tip pens and spray paint in random patterns, to provide "graffiti" markings. After these markings had dried the surfaces were cleaned with the cleaner described below. The applied coatings were removed along with the graffiti markings. Control surfaces (both hard and vinyl) coated with other materials and then similarly marked could not be completely cleaned, and retained clear remnants of their graffiti markings.

The cleaner is prepared as follows:

| Ingredient | Wt. % |
| --- | --- |
| Cellosolve | 75.0 |
| Water, deionized | 9.0 |
| Methylene chloride | 15.0 |
| Nonyl phenol ethoxylate, with 10–12 moles ethylene oxide | 0.5 |
| Triethanolamine | 0.5 |
| | 100.0 |

The ingredients are mixed in the order listed, with mild agitation, and the mixing is continued for 30 minutes after the last addition.

Unless otherwise stated, all ingredients are given in weight percent.

I claim:

1. A composition adapted for priming a surface prior to the application of a protective coating thereon and for removing said protective coating when defaced with graffiti, said composition consisting essentially of (in parts by weight):

| | |
| --- | --- |
| Ethylene glycol mono ethyl ether | 1.0–99.0 |
| Water | 1.0–20.0 |
| Methylene chloride | 5.0–55.0 |
| Non-ionic surfactant | 0.1–5.0 |
| Triethanolamine | 0.1–5.0 |

2. Composition according to claim 1 consisting essentially of (in parts by weight):

| | |
| --- | --- |
| Ethylene glycol mono ethyl ether | 45.0–85.0 |
| Water | 8.0–12.0 |
| Methylene chloride | 10.0–20.0 |
| Non-ionic surfactant | 0.3–1.0 |
| Triethanolamine | 0.3–1.0 |

3. Composition according to claim 2 consisting essentially of:

| | Wt. % |
| --- | --- |
| Ethylene glycol mono ethyl ether | 75.0 |
| Water, deionized | 9.0 |
| Methylene chloride | 15.0 |
| Nonyl phenol ethoxylate, with 10–12 moles ethylene oxide | 0.5 |
| Triethanolamine | 0.5 |

* * * * *